(12) United States Patent
Bosio

(10) Patent No.: US 9,797,118 B2
(45) Date of Patent: Oct. 24, 2017

(54) PULL-OUT SPRAYHEAD AND RELATED FAUCET PROVIDED WITH ENHANCED RECIPROCAL COUPLING SYSTEM

(71) Applicant: AMFAG S.r.l., Casaloldo (Mantova) (IT)

(72) Inventor: Orlando Bosio, Casaloldo (IT)

(73) Assignee: AMFAG S.R.L., Casalodo (Mantova) (IT)

( * ) Notice: Subject to any disclaimer, the term of this patent is extended or adjusted under 35 U.S.C. 154(b) by 27 days.

(21) Appl. No.: 14/328,417

(22) Filed: Jul. 10, 2014

(65) Prior Publication Data
US 2015/0013812 A1 Jan. 15, 2015

(30) Foreign Application Priority Data

Jul. 12, 2013 (EP) .................................... 13176394

(51) Int. Cl.
*E03C 1/04* (2006.01)
*E03D 5/00* (2006.01)
*F16L 37/00* (2006.01)

(52) U.S. Cl.
CPC ............ *E03C 1/0404* (2013.01); *E03D 5/003* (2013.01); *E03C 1/0405* (2013.01); *E03C 2001/0415* (2013.01); *F16L 37/004* (2013.01); *Y10T 137/9464* (2015.04)

(58) Field of Classification Search
CPC .... F16L 37/004; E03C 1/0404; E03C 1/0405; E03C 2001/0414; E03C 2001/0415; E03D 5/003; Y10T 137/9464
USPC ........................................ 137/801; 4/675–678
See application file for complete search history.

(56) References Cited

U.S. PATENT DOCUMENTS

| | | | | |
|---|---|---|---|---|
| 7,252,112 B1* | 8/2007 | Imler | .................... | F16L 37/004 137/614.04 |
| 8,127,782 B2* | 3/2012 | Jonte | ....................... | E03C 1/05 137/1 |
| 2009/0146412 A1* | 6/2009 | Schoenoff | ............ | F16L 37/004 285/9.1 |
| 2010/0170587 A1* | 7/2010 | Kaess | .................. | E03C 1/0404 137/801 |
| 2012/0042973 A1* | 2/2012 | Ko | ....................... | E03C 1/0404 137/801 |

* cited by examiner

*Primary Examiner* — Kevin Murphy
*Assistant Examiner* — Kelsey Rohman
(74) *Attorney, Agent, or Firm* — Hickman Palermo Becker Bingham LLP

(57) ABSTRACT

Pull-out sprayhead (1) for a faucet, comprising: an inlet fitting (10) provided with a coupling end (11*a*) which can be connected to an extractable water supply pipe; a supply mouth (10*d*) in fluid communication with said coupling end (10*d*); and a magnet (12) fixed at the inlet fitting (10) and designed to allow releasable connection of said pull-out sprayhead (1) to a faucet neck (20), said magnet (12) being arranged in a watertight housing chamber (13) defined between an outer wall of said inlet fitting (10) and a covering nut (14) fastened to said inlet fitting (10).

14 Claims, 6 Drawing Sheets

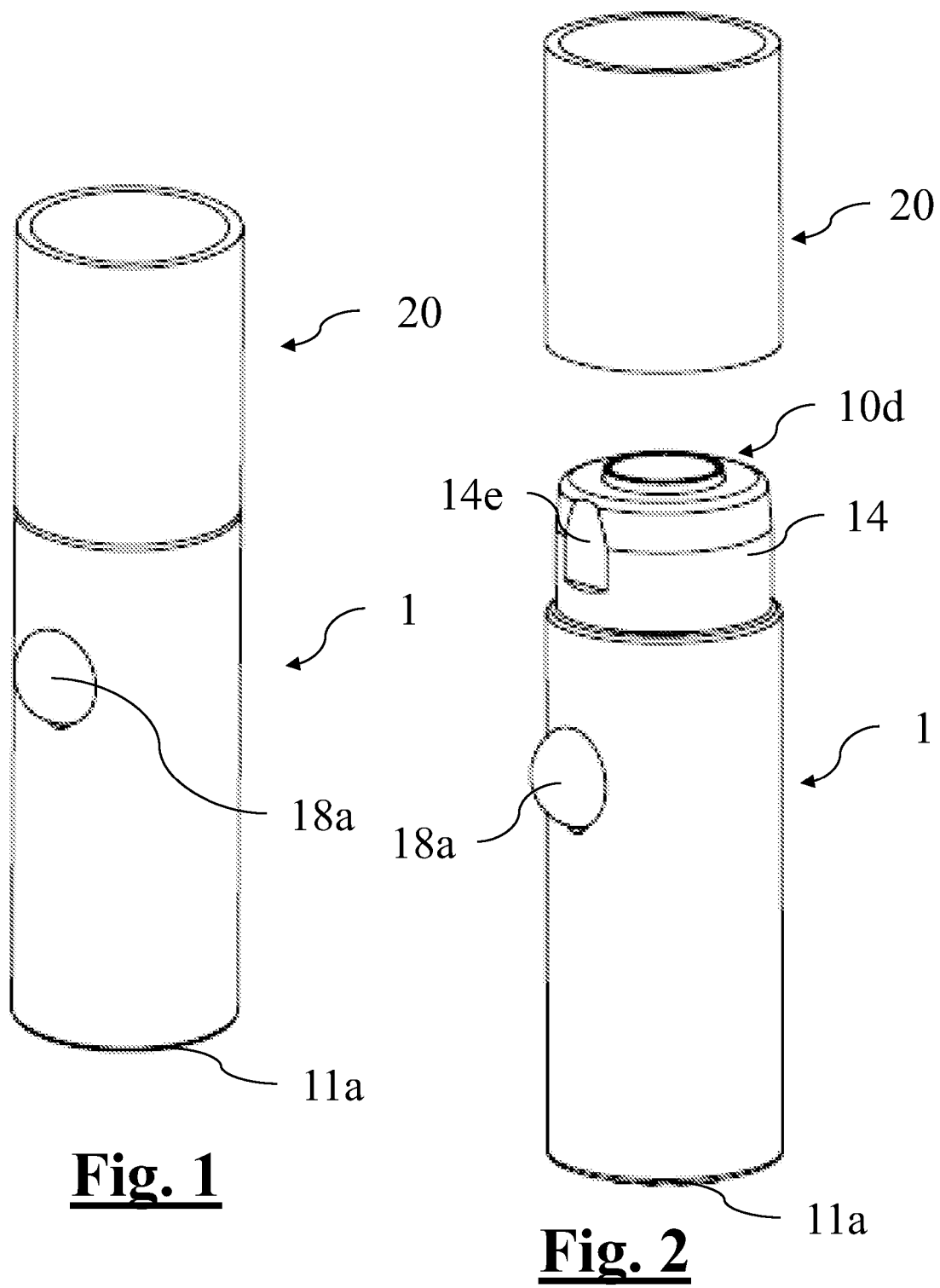

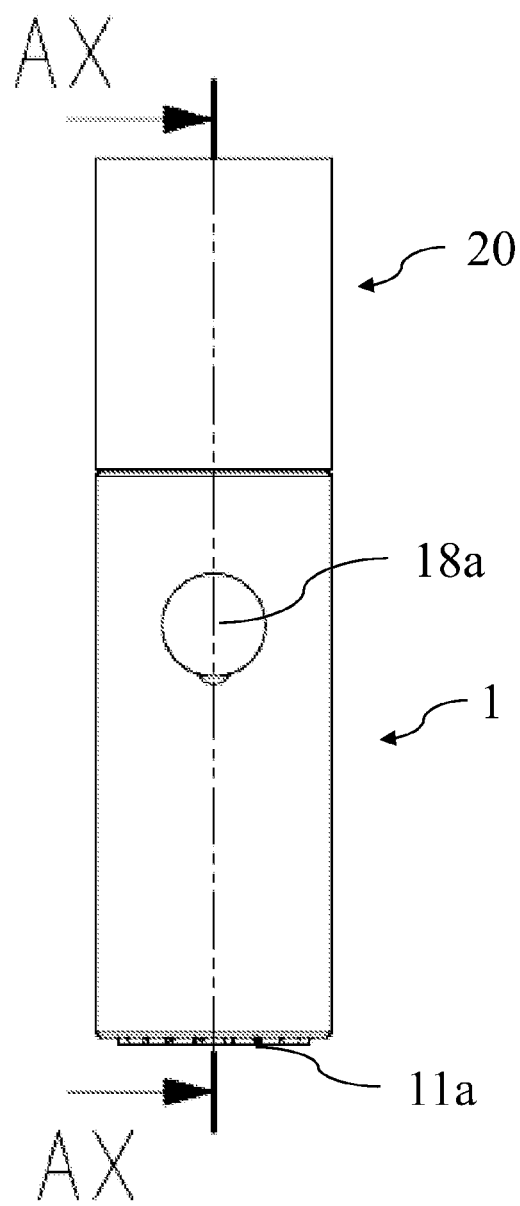
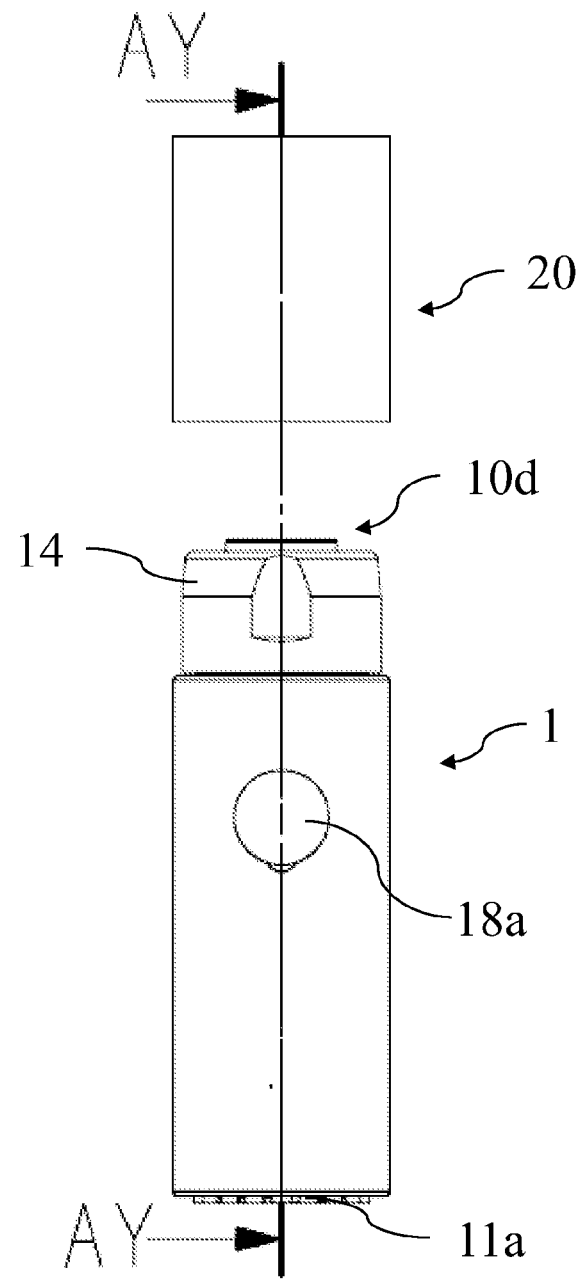
Fig. 3                    Fig. 4

PULL-OUT SPRAYHEAD AND RELATED FAUCET PROVIDED WITH ENHANCED RECIPROCAL COUPLING SYSTEM

BENEFIT CLAIM

This application claims the benefit under 35 U.S.C. §119 of priority from European Patent Office (EPO) application 13176394.8, filed Jul. 12, 2013, the entire contents of which are hereby incorporated by reference for all purposes as if fully set forth herein.

FIELD OF APPLICATION

The present invention relates to a pull-out sprayhead for a faucet, in particular for a kitchen tap, and to a related faucet provided with a pull-out sprayhead. The aforementioned devices have a useful application in the sector of tapware and accessories for tapware.

PRIOR ART

Taps provided with a pull-out sprayhead are nowadays widely employed, in particular as mixers for kitchen sinks. They have a supply piece, commonly called sprayhead, which may be extracted from its seat on the neck of the mixer so as to allow effective directing of the water jet. A flexible pipe, in general inserted inside the body of the mixer, but partially extractable so as to follow the movements of the sprayhead, keeps the latter connected to the water supply network.

A technical aspect arising from the devices described above relates to the connection of the sprayhead to the body of the tap. This connection must in fact allow easy and intuitive separation and repositioning by the user, ensuring at the same time stable and precise coupling together of the two components. While, in fact, the first requirement arises from obvious functional considerations, the second aspect influences the aesthetic perception of the product by the consumer.

A type of connection recently introduced, which satisfies in an excellent manner both the aforementioned requirements, envisages the magnetic coupling together of the sprayhead and the mixer neck, performed by associating respectively a magnet and a ferromagnetic element with each of the two parts to be connected.

Examples of such a connection are provided for instance in US 2012/042973 A1 and DE 20 2005 013425 U1.

A drawback associated with this solution, however, arises from the high corrosion sensitivity of most of the permanent magnets employed in the industry. Owing to the wet environment in which it is located, the magnet which defines the connection of the sprayhead risks in fact corroding with time, with possible surface damage and rapid deterioration of the magnetic properties.

The use of surface treatments or linings to prevent corrosion of the magnet has proved to be of limited effectiveness since the friction due to the continuous repositioning operations and the high operating temperatures in many cases result in rapid wear of the protective layer.

A possible alternative solution, proposed in the American U.S. Pat. No. 7,909,061, consists in overmoulding a shell of plastic material for protecting the magnet.

Although substantially satisfying the requirements of the sector, this solution nevertheless has the drawback of a relatively high cost due both to the overmoulding operation and to the need to provide mechanical fixing means for securing the shell thus formed to the sprayhead or neck of the faucet.

Moreover, the related thickness of the protective plastic shell results in a reduction in the intensity of the magnetic field during coupling and consequently less attractive force between the parts to be coupled together.

The technical problem forming the basis of the present invention is therefore that of devising a pull-out sprayhead which can be magnetically coupled to a faucet which solves the drawbacks described with reference to the prior art, namely prevents oxidation of the magnetic element, while at the same time maintaining a simple and low-cost system for fixing thereof.

SUMMARY OF THE INVENTION

The aforementioned technical problem is solved by a pull-out sprayhead for a faucet, comprising: an inlet fitting provided with a coupling end which can be connected to an extractable water supply pipe; a supply mouth in fluid communication with said coupling end; and a magnet fixed at the inlet fitting and designed to allow releasable connection of said pull-out sprayhead to a faucet neck, wherein the magnet is arranged in a watertight housing chamber defined between an outer wall of said inlet fitting and a covering nut fastened to said inlet fitting. Preferably, but not exclusively with these modes, such a nut is fastened by means of a threaded connection.

It will be noted that, as will emerge more clearly from the description of a number of embodiments of the invention, the threaded connection which fastens the covering nut to the inlet fitting must not necessarily be a direct connection; it is in fact possible to screw the covering nut to an intermediate member which is fixed, either by means of a further threaded connection or using any other fastening mode, to the body of the inlet fitting.

The use of a covering nut fastened or screwed on top of the inlet fitting represents a simple, low-cost and visually neutral way of performing fixing of the magnet to the pull-out sprayhead; moreover it defines a closed watertight chamber which protects the part from direct contact with the water, preventing corrosion thereof.

The housing chamber may moreover be easily sealed with sealing means so as to prevent any infiltration of water inside it, reducing even further the risks of corrosion.

Said magnet may in particular rest on a shoulder integral with the inlet fitting, said covering nut having a cup-shaped form which closes the end of the housing chamber situated opposite the shoulder: the covering nut may in fact have a lateral sleeve provided with an internal thread engaging on an outer thread integral with the inlet fitting and an end collar which closes said housing chamber, opposite to the shoulder.

In a first embodiment of the invention, the shoulder may be defined by an enlarged proximal portion integral with the inlet fitting, said outer thread being formed on the outer periphery of the same proximal portion.

In this case, the inlet fitting takes the form of a single one-piece structure on top of which the covering nut is directly screwed.

In a second embodiment, which is an alternative to the first embodiment, the shoulder is defined by a double-threaded bushing screwed onto a proximal portion of said inlet fitting, said outer thread being formed on the outer peripheral surface of said double-threaded bushing.

In this second case, the inlet fitting is advantageously in the form of a relatively simple tubular structure, and the covering nut is screwed on top of it with the double-threaded bushing arranged in between.

The sealing means may comprise a first annular gasket arranged between the magnet and the end collar of the covering nut, said first annular gasket being able to be compressed by screwing the covering nut with respect to the inlet fitting.

The sealing means may also comprise a second annular gasket arranged between a groove, formed in the proximal portion of the inlet fitting, and the lateral sleeve of the covering nut.

It should be noted that, in the first embodiment mentioned above, said groove is formed as an undercut in the single-piece body of the inlet fitting. In the second embodiment, on the other hand, the groove is delimited at the top by the double-threaded bushing screwed onto the main body of the inlet fitting.

The inlet fitting may have internally a connection thread intended for connecting the extractable water supply pipe. This connection system preserves the outer surface of the fitting for receiving the magnet and fixing the covering nut.

The pull-out sprayhead may also comprise a selector device along the flow path which connects the coupling end to the supply mouth, said selector device being able to be operated by means of an externally accessible control member. By means of the selector device it is possible to modify the form of the jet being emitted, choosing for example between a peripheral spray ring or a more compact central jet.

The aforementioned technical problem is also solved by a faucet comprising a pull-out sprayhead of the aforementioned type, where the faucet comprises a main body in which receives an extractable water supply pipe is inserted, which is connected to the coupling end of said inlet fitting, as well as magnetically attractable means at a neck of said main body, said magnetically attractable means cooperating with said magnet so as to perform the releasable connection of said pull-out sprayhead to said neck.

Said magnetically attractable means may comprise a ring of ferromagnetic material which can be associated for example by means of threaded connection with an inner wall of said neck; for example said means may consist of an iron ring provided peripherally with a thread.

Further characteristic features and advantages will appear more clearly from the detailed description provided hereinbelow of two preferred, but not exclusive, embodiments of the present invention, with reference to the attached figures provided by way of a non-limiting example.

BRIEF DESCRIPTION OF THE DRAWINGS

FIG. 1 shows a perspective view of the pull-out sprayhead according to a first embodiment of the present invention, associated with a faucet neck;

FIG. 2 shows a perspective view of the pull-out sprayhead and the faucet neck of FIG. 1 in the detached configuration;

FIG. 3 shows a side view of the pull-out sprayhead and the faucet neck according to FIG. 1;

FIG. 4 shows a side view of the pull-out sprayhead and the faucet neck of FIG. 3 in the detached configuration;

DETAILED DESCRIPTION

Figure 5:
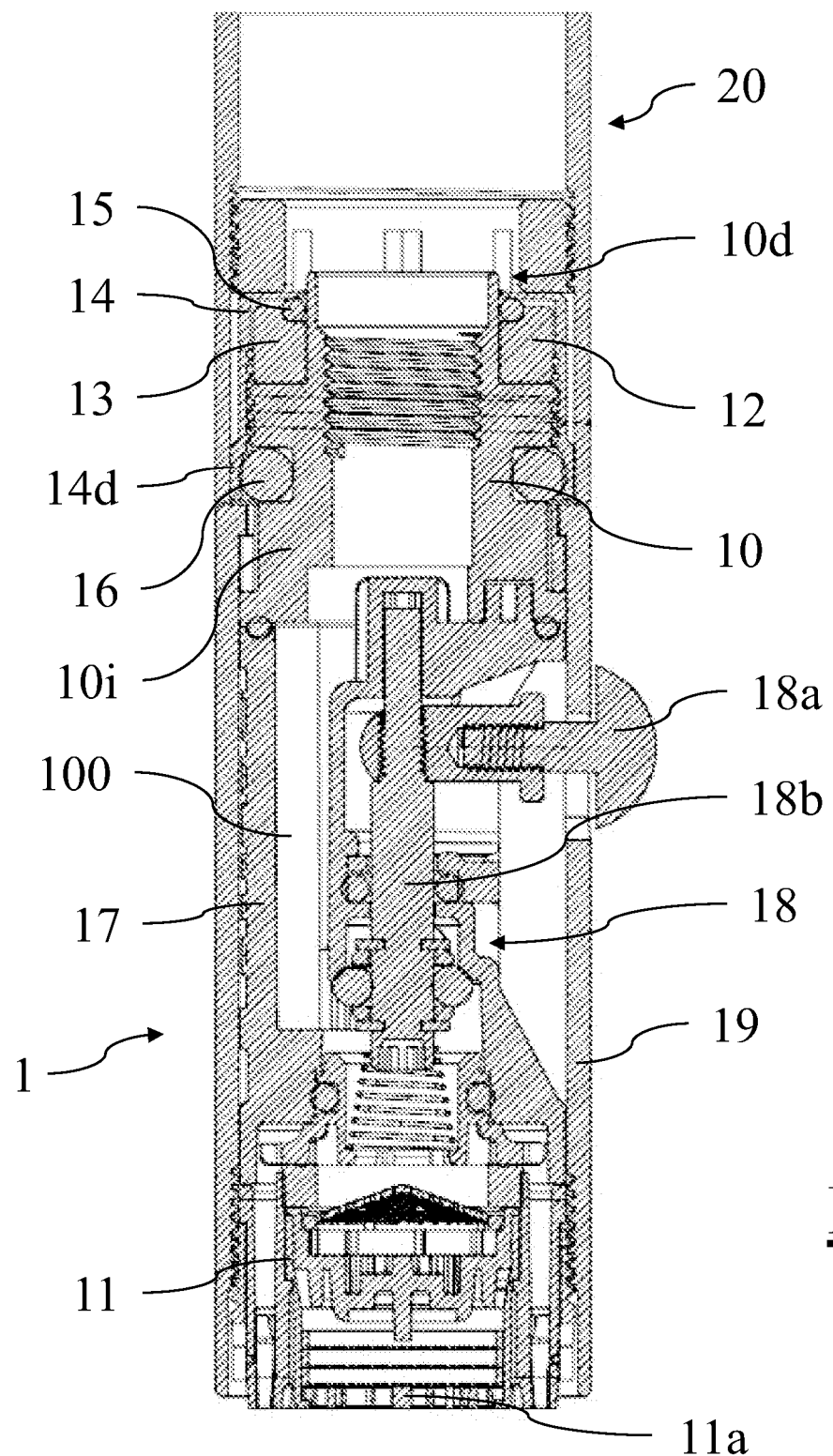
FIG. 5 shows a view of the extractable sprayhead and the faucet neck sectioned along the plane AX-AX of FIG. 3.
Figures 6, 7:
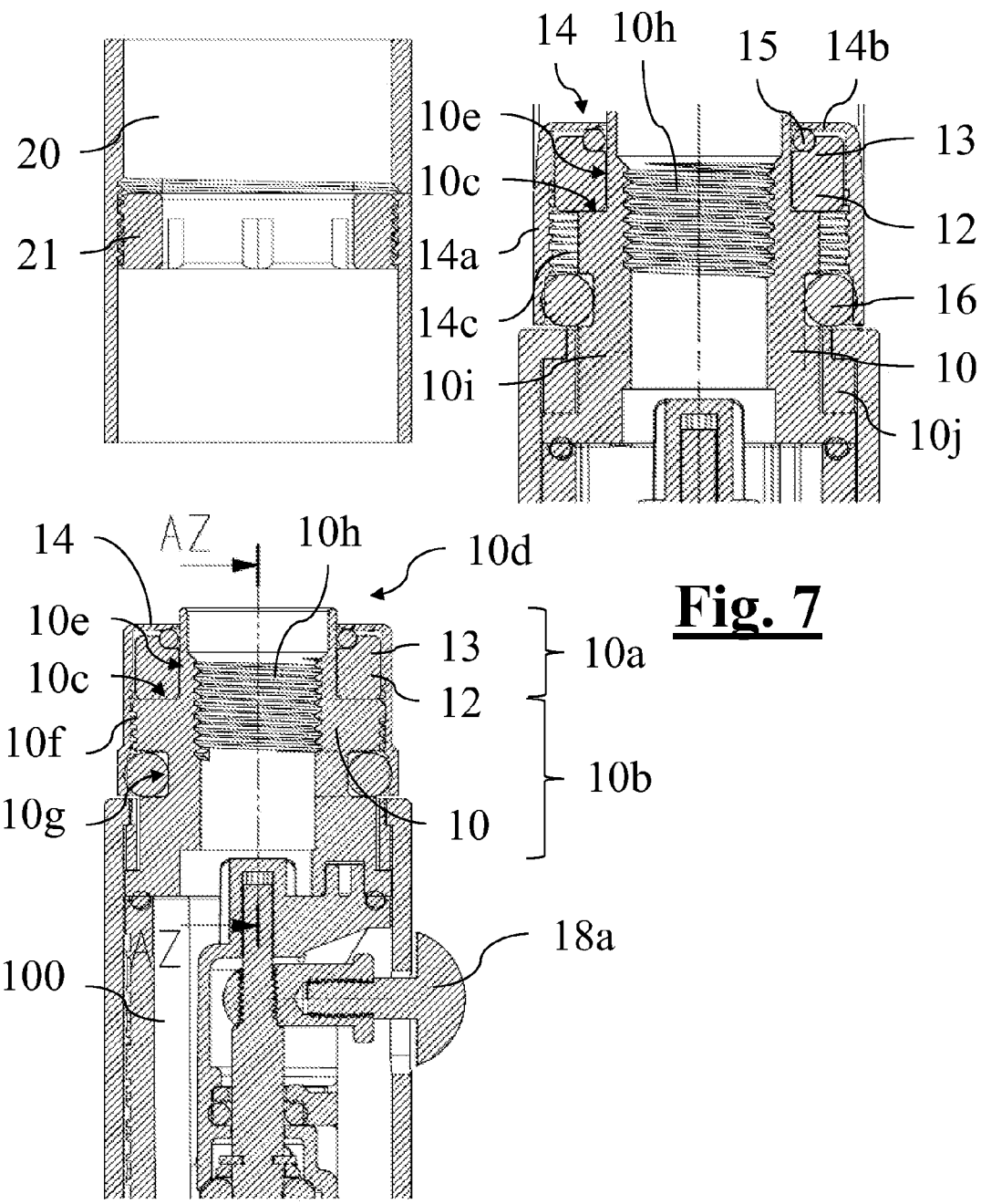
FIG. 6 shows a view of the extractable sprayhead and the faucet neck sectioned along the plane AY-AY of FIG. 4.
FIG. 7 shows a view of a detail of the pull-out sprayhead sectioned along the plane AZ-AZ of FIG. 6.

With reference to the attached FIGS. 1-7, 1 denotes in general a pull-out sprayhead designed according to a first embodiment of the present invention and intended to be releasably engaged with a faucet, preferably a kitchen mixer. The figures show only the end part of said faucet, namely the neck 20 inside which the pull-out sprayhead 1 is inserted in its rest configuration.

It can be noted that the extractable sprayhead 1 may be commercially distributed separately from the faucet body with which it is associated; also it is possible, by means of minimum structural modifications to be made at the outlet mouth, to adapt the existing tapware so as to allow mounting of the pull-out sprayhead 1 thereon.

The pull-out sprayhead 1 extends longitudinally from a first coupling end 10*d* to a supply mouth 11*a*.

A flexible water supply pipe, which passes through the faucet body and is connected to the water mains, is connected at the coupling end 10*d* in the ways described below. The water from the water mains is thus introduced along a flow path 100 which is defined inside the pull-out sprayhead and emerges in the supply mouth 11*a* situated opposite the coupling end 10*d*. The flow path 100 passes through a selector device 18, namely a flow switch which can be configured in two different positions, allowing modification of the form of the flow from the supply mouth 11*a*.

The pull-out sprayhead 1, in its rest configuration, is mounted at the inlet mouth if the neck 20 of the faucet and ensures physical continuity with respect to said neck 20. In an operating configuration, the pull-out sprayhead 1 may be detached from said neck 20, drawing along with it the flexible pipe which connects it to the water mains.

The rest configuration mentioned above is maintained owing to the magnetic attraction action which occurs between a magnet 12, integral with the pull-out sprayhead, and a ferromagnetic element 21, which is instead integral with the neck 20 of the faucet. The configurations and modes of fixing these parts will be explained more fully in the description below.

The pull-out sprayhead 1 comprises a tubular body 19 which houses the aforementioned selector device 18 and has the supply mouth 11*a* at its bottom end.

In the preferred embodiment described here, said tubular body 19 has a cylindrical form and diameter the same as that of the similar cylindrical form of the neck 20 of the faucet with which the pull-out sprayhead 1 is associated.

The tubular body 19 houses, at its top end situated opposite the supply mouth 11*a*, an inlet fitting 10 which protrudes partially from this tubular body 19 and forms the hydraulic connection with the aforementioned flexible supply pipe. The inlet fitting 10 has a tubular form and defines internally the upstream section of the flow path 100 inside the pull-out sprayhead 1. A connection thread 10*h* intended for connecting the end of the extractable water supply pipe is formed inside this section.

The inlet fitting 10 is divided into a distal portion 10a and a proximal portion 10b which differ mainly with regard to their outer form. The distal portion 10a, removed from the tubular body 19, has in fact a cylindrical structure with a diameter smaller than the underlying proximal portion 10b.

The proximal portion 10b of the inlet fitting 10 has a base 10i which is introduced inside a hole with the same cross-section formed in the upper surface of the tubular body 19. The base 10i is provided with a circular flange which retains it inside the tubular body 19; a connecting ring 10j is also arranged between the flange and the upper surface of the tubular body 19. It can be noted that the base 10i has two faceted surfaces so that the inlet fitting 10 is rotatably locked with respect to the tubular body.

Above the base 10i, the proximal portion 10b has a partial outer thread 10f which allows screwing on top of the inlet fitting 10 of a covering nut 14 described below. The base 10i is separated from the outer thread 10f by a circumferential groove 10g.

The reduction in diameter between the distal portion 10a and the proximal portion 10b defines a shoulder 10c on top of which the magnet 12 rests. Said magnet 12, which has an annular form, also bears against an outer wall 10e of the distal portion 10a.

The covering nut 14, being screwed on top of the aforementioned outer thread 10f, defines a housing chamber 13 which encloses the magnet 12. In the case in question, said covering nut 14 has a substantially cylindrical lateral sleeve 14a, which laterally surrounds the magnet 12, and an end collar 14b which closes the annular end of the housing chamber 13 situated opposite the shoulder 10c. The lateral sleeve 14a has an inner thread 14c which engages over the outer thread 10f of the inlet fitting 10.

The housing chamber 13 is sealed by means of special sealing means, comprising in the case in question a first annular gasket 15 and a second annular gasket 16.

The first annular gasket 15, arranged between the magnet 12—which has at the top a circular cavity intended to receive said annular gasket—and the end collar 14b of the covering nut 14, embraces the distal portion 10a of the inlet fitting 10. By tightening the covering nut 14 on top of the inlet fitting 10, said seal 15 is suitably compressed.

The second annular gasket 16, which defines a bottom seal for the housing chamber 13, sits inside the circumferential groove 10g of the proximal portion 10b of the inlet fitting 10. This seal 16 is therefore arranged, with respect to the housing chamber 13, on the opposite side of the threaded connection between the covering nut 14 and the inlet fitting 10.

A suitably flared end portion 14d of the covering nut 14, which extends as far as the top end of the tubular body 19, hides the second annular gasket 16 from the sight of the user.

Underneath the base 10i of the inlet fitting 10, the tubular body 19 houses an intermediate stage 17 which defines internally the selector device 18. The selector device 18 comprises a stem 18b, joined to a closing member, which may be selectively positioned in two alternative configurations in which the outgoing flow is respectively deviated towards a peripheral ring of the supply mouth 11a or towards a central area of the latter. A control member 18a outside the tubular body 19, consisting in the case here of a sliding button, is kinematically connected to the stem 18b and allows the user to operate said selector device 18.

Underneath the aforementioned intermediate stage 17, the tubular body 19 also houses an outlet stage 11 comprising in particular one or more jet diffusers/ventilators of the known type. The outlet stage 11 consists of a cylindrical device which is screwed inside the tubular body 19, thus retaining, in a packet arrangement, the intermediate stage 17 situated above and the circular flange of the base 10i of the inlet fitting 10.

As can be seen from the above description, the covering nut 14 defines a top cap of the pull-out sprayhead 1 which, protruding with respect to the tubular body 19, surrounds the inlet fitting 10 and encloses in a sealed manner the magnet 12.

In the rest configuration of the pull-out sprayhead 1, this covering nut 14 is introduced completely inside the inlet mouth of the neck 20 of the faucet, while the top end of the tubular body 19 is locked and bears against the bottom of this inlet mouth.

It can be noted that the covering nut 14 has externally two lateral recesses 14e which allow it to be engaged with a tightening tool.

The ferromagnetic element 21, which in this case consists of an externally and peripherally threaded ring, is screwed onto a corresponding inner thread formed in the neck 20 of the faucet, at a distance from the inlet mouth.

In the rest configuration described above, said ferromagnetic ring 21 is located flush with the outer surface of the end collar 14b of the covering nut 14.

It can be noted that the aforementioned ferromagnetic element 21 may be easily fixed using systems other than that described above, for example by means of gluing, keying or an interference fit, inside the neck of already existing tapware, so that the pull-out sprayhead 1 according to the present invention may be adapted to said tapware.

Figures 8, 9:
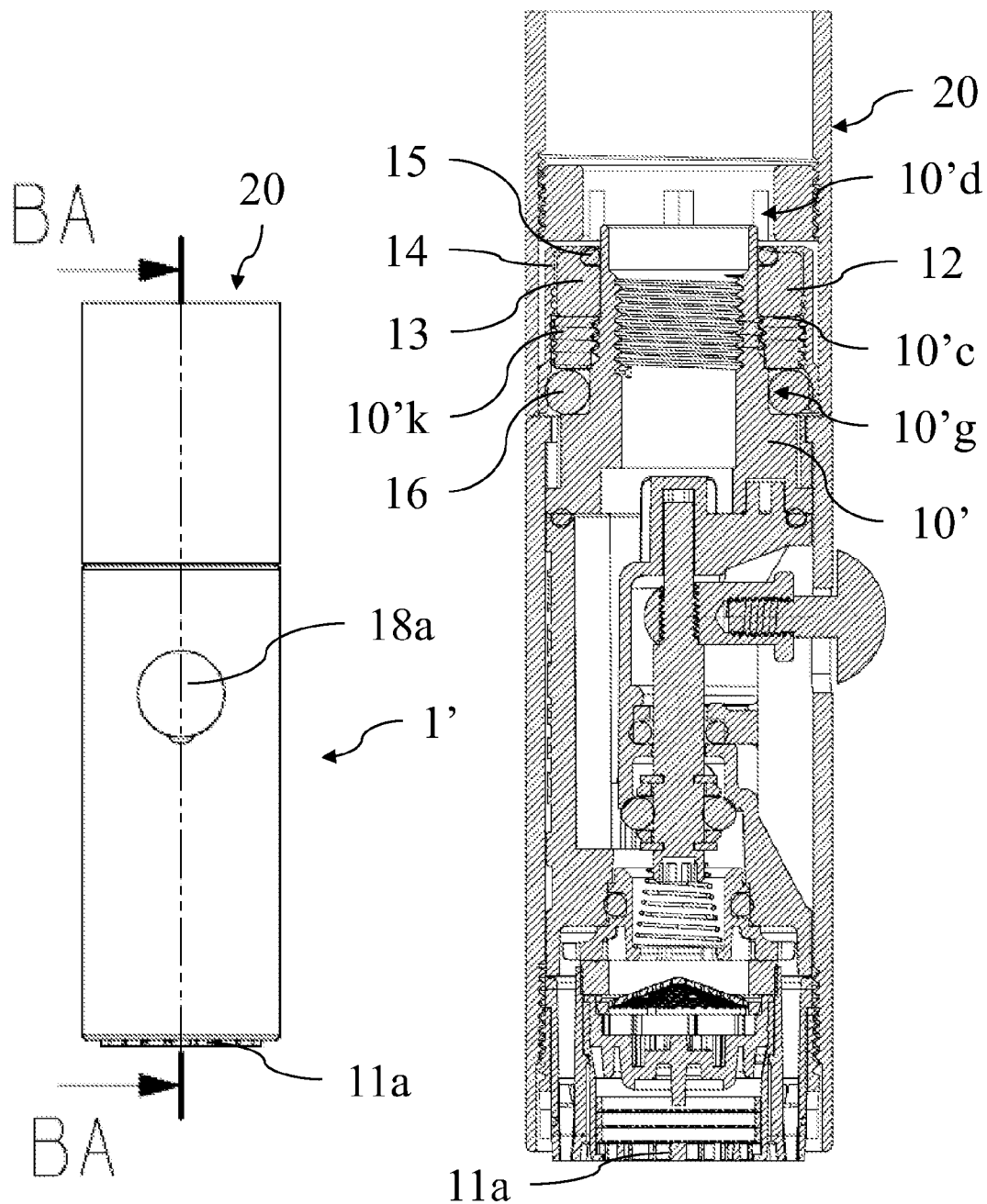
FIG. 8 shows a perspective view of the pull-out sprayhead according to a second embodiment of the present invention, associated with a faucet neck.
FIG. 9 shows a view of the extractable sprayhead and the faucet neck sectioned along the plane BA-BA of FIG. 8.
Figure 10:
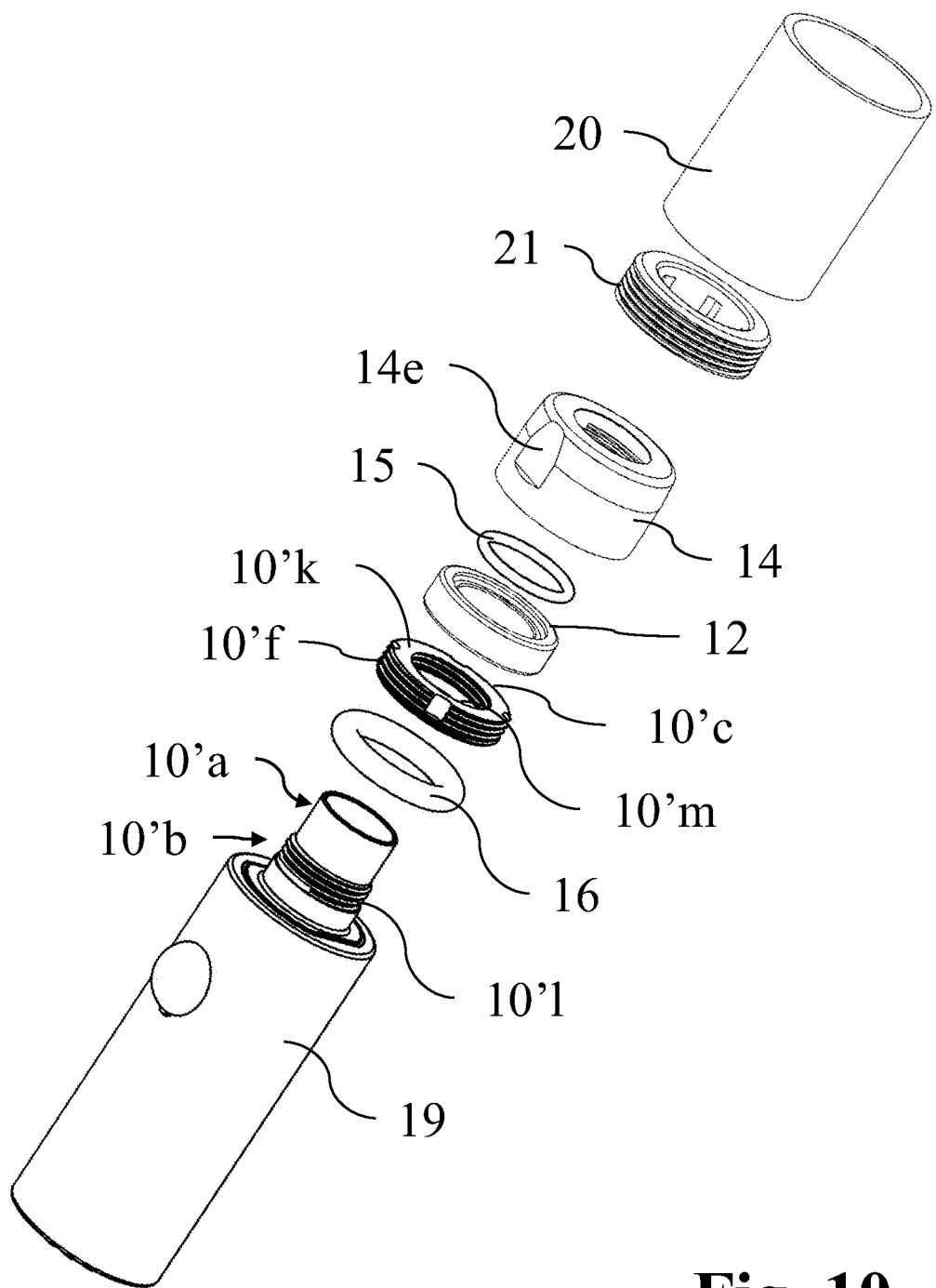
FIG. 10 shows a perspective exploded view of the pull-out sprayhead and the faucet neck according to FIG. 8.

With reference to the attached FIGS. 8-10, 1' denotes in general a pull-out sprayhead designed according to a second embodiment of the present invention, said sprayhead being associated with a faucet neck 20 in a manner entirely similar to that described above.

The pull-out sprayhead 1' according to the second embodiment has all the functional and form characteristics of the similar pull-out sprayhead discussed above, with the sole exception of the configuration of the inlet fitting 10'.

Owing to this similarity, the parts of the pull-out sprayhead 1' not forming part of the inlet fitting 10' are defined in the figures and description with the same reference numbers used before; the parts forming part of the inlet fitting 10' of the pull-out sprayhead 1' according to the second embodiment are instead distinguished by the addition of an apostrophe.

Below only the parts of the device which are modified with respect to the previously described embodiment are described.

In the first embodiment described above, the proximal portion 10b of the inlet fitting 10 comprises an enlarged annular portion which is formed as one piece and which defines at the top the shoulder 10c, along the side the outer thread 10f and at the bottom the groove 10g. In the second embodiment, this enlarged annular portion is instead defined by a part mounted on the inlet fitting 10', in this case a double-threaded bushing 101 which is screwed, by means of its inner thread 10'm, onto a corresponding peripheral thread 10'1 of the inlet fitting.

The other thread of the double-threaded bushing 10'k defines the outer thread 10'f on top of which the covering nut 14 is screwed. The top surface of the double-threaded bushing 10'k defines the support shoulder 10'c for the magnet 12, while the bottom surface delimits at the top the groove 10'g which seats the second annular gasket 16.

The main body of the inlet fitting 10' which protrudes from the tubular body 19 has a substantially tubular shape:

the proximal portion 10'a has a cylindrical outer configuration, the proximal portion 10'b has a section with a cylindrical outer configuration of larger diameter and a joining section which is again cylindrical. The top part of the joining section has, formed therein, a peripheral thread 10'l, while the cylindrical bottom section delimits the bottom of the groove 10'g.

It can be noted that the configuration of the inlet fitting 10 of the first embodiment is substantially identical to that of the inlet fitting 10' of the second embodiment in the assembled configuration; while, however, in the first case the part consists of one piece, in the second case it consists of two components assembled on each other.

An advantage of the present invention relates to the simplicity and corresponding low cost of the system for fixing the magnet to the pull-out sprayhead.

Another advantage of the present invention arises from the possibility of being able to replace easily the magnet which performs connection of the sprayhead, it being sufficient to unscrew the protective nut in order to access the part.

Another advantage lies in the impermeable nature of the magnet housing chamber which allows the magnet to be protected against corrosion.

A further advantage consists in the fact that the pull-out sprayhead according to the present invention may be easily adapted to tapware which originally did not envisage the magnetic coupling system.

Obviously, a person skilled in the art, in order to satisfy any specific requirements which arise, may make numerous modifications and variations to the invention described above, all of these moreover being contained within the scope of protection of the invention, as defined by the following claims.

The invention claimed is:

1. A pull-out sprayhead for a faucet, comprising:
an inlet fitting provided with a coupling end which can be connected to an extractable water supply pipe, said inlet fitting comprising at least a tubular end portion having a lateral cylindrical outer surface;
a supply mouth in fluid communication with said coupling end;
a covering nut fastened to said inlet fitting;
a completely watertight housing chamber defined: below, by a bottom shoulder; above, by a first portion of said covering nut; laterally, by a second portion of said covering nut and by the lateral cylindrical outer surface of the inlet fitting; and
a magnet arranged within said completely watertight housing chamber and around said inlet fitting, designed to allow releasable connection of said pull-out sprayhead to a faucet neck.

2. The pull-out sprayhead of claim 1, wherein said watertight housing chamber is sealed with at least one gasket.

3. The pull-out sprayhead of claim 2, wherein said at least one gasket comprises a first annular gasket arranged between the magnet and an end collar of the covering nut.

4. The pull-out sprayhead of claim 3, wherein said covering nut has a lateral sleeve provided with an inner thread engaged on an outer thread integral with the inlet fitting, the end collar of the covering nut being opposed to a shoulder on which the magnet rests, so that said first annular gasket is compressed by screwing the covering nut with respect to the inlet fitting.

5. The pull-out sprayhead of claim 2, wherein said at least one gasket comprises an annular gasket arranged between a groove formed on a proximal portion of the inlet fitting and a lateral sleeve of the covering nut.

6. The pull-out sprayhead of claim 3, wherein said at least one gasket comprises a second annular gasket arranged between a groove formed on a proximal portion of the inlet fitting and a lateral sleeve of the covering nut.

7. The pull-out sprayhead of claim 1, wherein said magnet rests on a shoulder integral with the inlet fitting and said covering nut has a cup-shaped configuration which closes the end of the housing chamber opposite the shoulder.

8. The pull-out sprayhead of claim 7, wherein said covering nut has a lateral sleeve provided with an inner thread engaged on an outer thread integral with the inlet fitting and an end collar which closes said housing chamber, opposite to the shoulder.

9. The pull-out sprayhead of claim 8, wherein the shoulder is defined by an enlarged proximal portion integral with the inlet fitting, said outer thread being formed on the same proximal portion.

10. The pull-out sprayhead of claim 8, wherein the shoulder is defined by a double-threaded bushing screwed onto a proximal portion of said inlet fitting, said outer thread being formed on an outer peripheral surface of said double-threaded bushing.

11. The pull-out sprayhead of claim 1, wherein said nut is fastened to the inlet fitting by means of a threaded connection.

12. A faucet comprising the pull-out sprayhead of claim 1, said faucet comprising a main body in which an extractable water supply pipe is inserted, which is connected to the coupling end of the inlet fitting of said pull-out sprayhead, said faucet also comprising a magnetically attractable member at a neck of said main body, said magnetically attractable member cooperating with the magnet of said pull-out sprayhead so as to perform a releasable connection of said pull-out sprayhead to said neck.

13. The faucet of claim 12, wherein said magnetically attractable member comprises a ring of ferromagnetic material which is fastened peripherally to an inner wall of said neck.

14. The faucet of claim 13, wherein fastening between the ferromagnetic ring and the inner wall of said neck is achieved by means of a threaded connection.

* * * * *